July 31, 1956  J. G. LINDEMAN  2,756,659
RELEASABLE PLOW STANDARD
Filed April 16, 1951  2 Sheets-Sheet 1
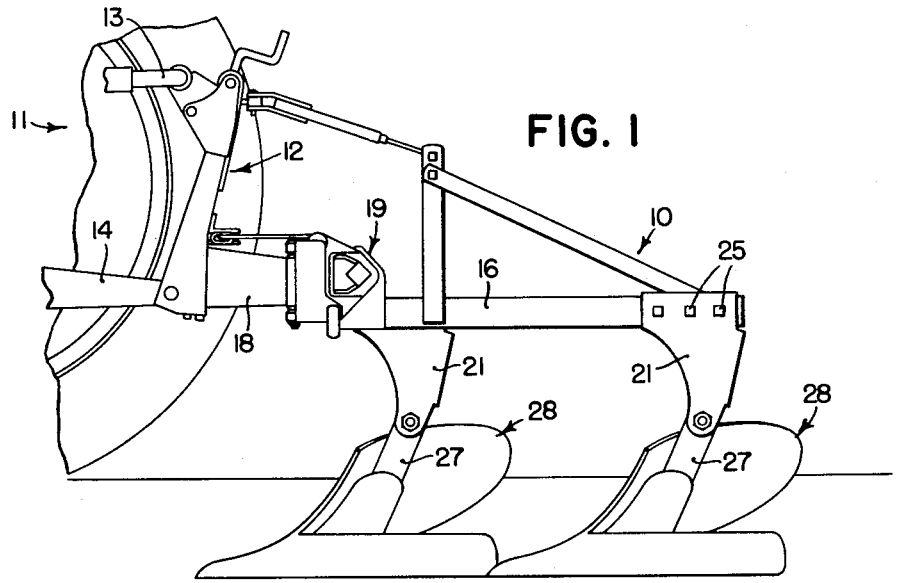
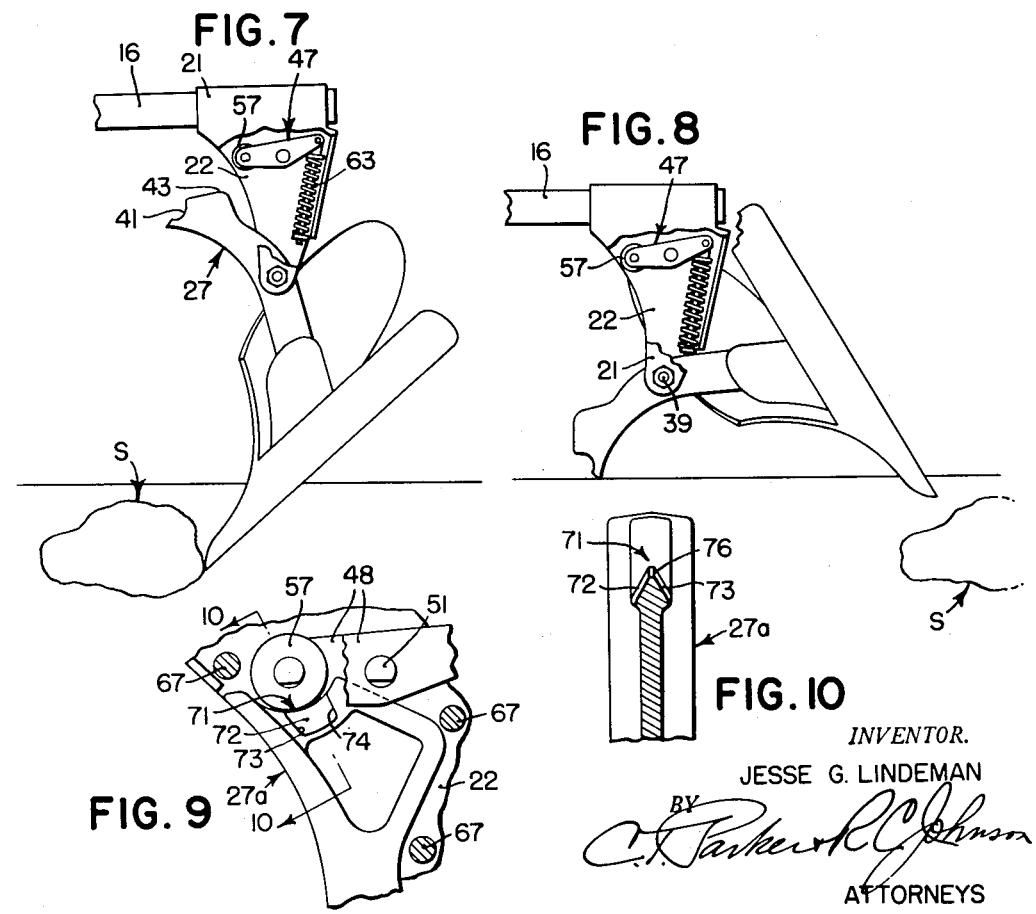
INVENTOR.
JESSE G. LINDEMAN
ATTORNEYS

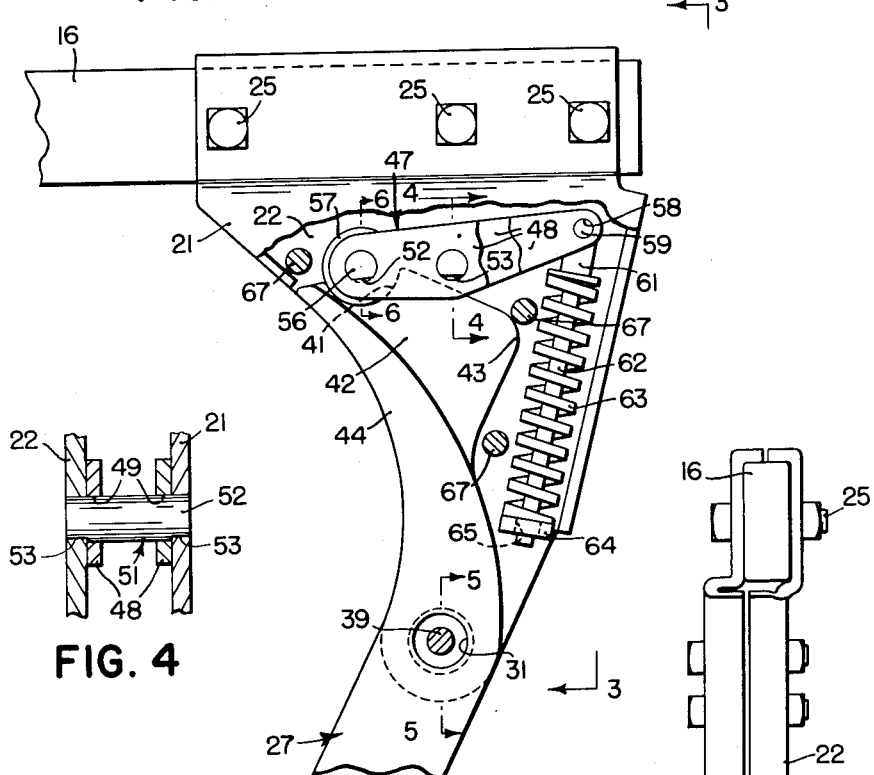

United States Patent Office 2,756,659
Patented July 31, 1956

2,756,659

RELEASABLE PLOW STANDARD

Jesse G. Lindeman, Yakima, Wash., assignor to Deere & Company, Moline, Ill., a corporation of Illinois Application April 16, 1951, Serial No. 221,161

9 Claims. (Cl. 97—47.89)

The present invention relates generally to agricultural implements and more particularly to ground-working implements, such as plows and the like, having ground-working tool means operating below the surface of the ground, which tool means may be damaged by continued forward travel of the outfit after one or more of the tool means encounters an obstruction, such as a large stone or boulder, stump, root, or the like.

The object and general nature of the present invention is the provision of an agricultural machine, such as a plow, having overload release means in the form of a safety trip whereby the ground-working unit will automatically release when the unit strikes an obstruction. More particularly, it is a feature of this invention to provide a plow having one or more plow bottoms, each mounted on a pivoted standard which is normally held in non-pivoting relation between a pair of plow beam brackets, preferably by safety trip means disposed between and protected by said bracket plates. Further, it is a feature of this invention to provide new and improved safety trip means, especially adapted for mounting between the bracket plates of a plow or the like, and for new and improved means pivotally connecting the plow standard, on which the plow bottom is mounted, to the bracket plates of the plow beam.

These and other objects and advantages of the present invention will be apparent to those skilled in the art after a consideration of the following detailed description, taken in conjunction with the accompanying drawings.

In the drawings:

Figure 1 is a side view of a two-bottom, tractor-mounted plow in which the principles of the present invention have been incorporated.

Figure 2 is an enlarged fragmentary detail view of the safety trip mechanism with which each of the plow bottoms shown in Figure 1 is equipped.

Figure 3 is a rear view, taken generally along the line 3—3 of Figure 2.

Figures 4, 5 and 6 are sectional views taken, respectively, along the lines 4—4, 5—5 and 6—6 of Figure 2.

Figure 7 is a fragmentary view showing how the safety trip releases the plow standard for rearward swinging so as to clear an obstruction, such as a large stone or boulder.

Figure 8 shows the position of the plow standard after the safety trip mechanism has been released but before the tractor has been backed to restore the tripped bottom back into its plowing position.

Figures 9 and 10 are fragmentary views showing a modified form of the present invention.

Referring now to the drawings, the plow in which the principles of the present invention have been incorporated is indicated in Figure 1 by the reference numeral 10 and is shown as connected with a tractor 11 by a vertically swingable draft frame unit 12 that is connected with the tractor 11 through upper and lower swingable members 13 and 14. The plow 10 includes a pair of plow beams 16 connected at their forward ends to a releasable hitch structure 17 that is connected with the lower end of the draft frame 10 through laterally swingable links 18. The present invention is not concerned with the particular details of the hitch mechanism, the same being conventional so far as the present invention is concerned.

Connected to the rear end of each of the plow beams 16 is a pair of bracket plates 21 and 22, each comprising a generally triangular member, the upper portions of the plates being apertured to receive bolts 25 which fix the upper portions of the bracket plates 21 and 22 to the associated beam 16 at opposite sides thereof. A standard 27 is pivotally connected with the lower portions of each pair of bracket plates and at its lower end each standard 27 carries a plow bottom 28 which, so far as the present invention is concerned, may be conventional.

At their lower portions each of the bracket plates 21 and 22 is formed with an enlarged aperture 31, and disposed in each of the apertures 31 is a bushing 32 having at its outer side a radially outwardly extending flange 33. The intermediate portion of the standard 27 is provided with a through aperture 35 which at its ends opens into recesses 36, one at each side of the standard 27, which recesses receive the laterally inner ends of the bushings 32. A clamping bolt 39 extends through the bushings 32 and the opening 35, and when tightened the bolt 39 fixedly connects the bushings 32 to the standard 27 so as to rock therewith in the bracket apertures 31 relative to the bracket plates 21 and 22. This construction provides a sturdy support for the bracket 27 in the lower portions of the bracket plates 21 and 22, yet the standard 27 is freely swingable relative to the bracket plates.

The upper portion of the standard 27 is of special formation. The upper end portion is formed with an upwardly facing, generally semi-circular notch 41 formed in a relatively narrow rib or flange 42 that is a part of the upper end of the standard 27. The cam section 42 is curved, as at 43, for a purpose which will be explained below, and a forward edge portion 44 of the upper end of the standard 27 is shaped to lie between the forward portions of the bracket plates 21 and 22.

A detent arm 47 is pivotally mounted on the bracket plates 21 and 22 just underneath the rear end of the beam 16. The detent arm 47 is preferably made up of a pair of strap members 48 the generally central portions of which are provided with a circular opening 49. A pivot member 51 is disposed in the openings 49 and is provided with non-circular end portions 52. Preferably, the non-circular ends 52 are formed by slabbing off portions of the ends of the pivot member 51, as indicated at 53 in Figures 2 and 4. The forward ends of the strap members 48 are similarly apertured to receive a pivot member 56 on which a roller 57, disposed between the strap members 48, is journaled. The rear ends of the detent members 48 are apertured, as at 58, Figure 2, to receive a pivot 59 which receives a cap 61 into which the upper end of a spring rod 62 is threaded. A spring 63 is disposed about the rod 62 and at its upper end bears against the lower end of the cap 61. At its lower end the spring 63 bears against a lug 64, and the lug 64 is apertured, as at 65, so that the lower end of the rod 62 extends slidably therethrough. The lug 64 is welded to one of the bracket plates, preferably the bracket plate 21, as best shown in Figure 3. The two bracket plates 21 and 22 are held together in assembled relation by three clamping bolts 67, and as best shown in Figure 4, as long as the bracket plates 21 and 22 are held together in assembled relation, the pivot pin 52 is held in position for supporting the detent lever 47, and since the strap members 48 of the latter are held against outward displacement, the pivot bolt 56, upon which the roller 57 is mounted, is held in position between the members 48 without requiring that the pivot 56 be fixed to either member. The ends of the pivot 56 are slabbed off, in substantially the same way as the pivot member 52, whereby the pivot member 56 is held against turning in the strap members 48. The cam or flange 42 at the rear side of the upper end portion of the standard 27 is relatively narrow so as to lie in the space between the strap members 48 of the detent lever 47, as best shown in Figure 6.

The operation of the safety trip device of the present invention is substantially as follows.

The normal or plowing position of the parts is shown in Figures 1 and 2. If, for example, the point of the rear bottom 28 (Figure 1) should strike a stone or the like, such as is indicated by the reference character S in Figure 7, the lower end of the standard 27, together with the associated plow bottom 28, will swing rearwardly, forcing the forward end of the standard forwardly. This causes the roller 57 to be forced out of the notch 41 against the action of the spring-biased detent 47. As the upper end of the standard 27 swings forwardly, the roller 57 rides along the upper forward portion of the cam section 43 until the upper end of the standard 27 moves away from the roller. The plow is then free to swing into the position shown in Figure 8, with the plow point disposed rearwardly and in a position to clear the obstruction S. The spring 63 is preferably one of the type which is relatively rigid and has a limited extension so that the roller 57 and arm or lever 47 remain in about the position shown in Figures 7 and 8 when the plow is in its completely tripped position. However, even if the spring 63 should expand, when the plow is completely tripped, beyond the position shown in Figures 7 and 8, the rear end of the arm or lever 47 will merely contact the lower edge of the plow beam 16, as will be seen from Figure 2, so that when the tractor is backed and the upper end of the plow standard 27 swung rearwardly, the cam section 43 will engage the roller 57 so as to lift the front end of the lever 47 so as to permit the roller 57 to roll along the surface 43 into a position to drop into the notch 41, whereby the safety trip mechanism is reset and the plow again dropped into operating position but protected, as before, against damage in the event an obstruction is encountered.

A modified form of the present invention is shown in Figures 9 and 10. In this form of the invention, the upper end portion of the standard, which is indicated in its entirety by the reference numeral 27a, is provided with a generally semicircular notch 71 which is slightly larger than the associated roller 57. Also, recessed portions 72 and 73 are formed at each side of the upper or inner end of the standard 27a. The front and rear extremities of these relieved portions 71 and 72 are shown in Figure 9 at 73 and 74, respectively. As best shown in Figure 10, this forms a narrow section 76 generally in the middle or central portion of the notch 71 and provides means facilitating the discharge of dirt and other foreign matter from the socket 71. If dirt and other foreign material were permitted to build up in the socket 71, the roller would be held out of its proper position and the responsiveness of the device to an overload would be materially affected.

The purpose in having the socket 71 of slightly larger radius than that of the roller 57 is twofold. First, with the parts constructed in this way, the roller is prevented from taking a set on its bearing pin or in the socket, since variations in the forces tending to rock the standard away from the roller cause the latter to change its position slightly, thus tending to eliminate dirt, rust and the like which might tend to prevent movement of the roller out of the socket. Secondly, the slight although often shifting of the roller in the socket tends to prevent dirt and rust from building up in the socket.

When the roller is not moving or working in the socket 71, the pressure of the associated spring 63 (see Figure 2) forces the roller to the bottom or narrow portion 76 of the socket. However, as soon as the plow enters the ground and normal working pressures act against the share and moldboard, the roller will tend to roll up the rearward face of the socket until it finds a position of proper balance between the effective pressure exerted by the spring 63 and the pressure of the soil against the share and moldboard. The roller remains in substantially this position during normal working position, but if the standard should be subjected to a shock or impact load, such as that encountered when the plowshare meets an obstruction, the roller moves out of the socket 71 and permits the plow bottom to swing rearwardly and upwardly, substantially into the position shown in Figure 8. In Figure 9, the difference between the radius of the roller 57 and the radius of the arcuate notch 71 is greatly exaggerated in order to illustrate this feature of my invention. Actually the difference is a matter of only a few thousandths of an inch.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

1. In a plow including a generally fore-and-aft extending beam having a pair of generally laterally spaced brackets fixed to the rear end of said beam on opposite sides thereof, the improvement which comprises a standard disposed generally vertically, a plow bottom fixed to the lower end of said standard, means for pivotally connecting the intermediate portion of said standard above said plow bottom to the lower portions of said brackets, and resiliently yieldable means acting between said brackets and the upper end of said standard for releasably holding the latter against swinging about the pivotal connection of said standard with the lower end portions of said brackets, the upper end of said standard being notched, said yieldable means comprising a lever pivotally mounted and disposed substantially wholly between the upper portions of said brackets above said standard and below the rear end of said beam, means on one end of said lever seating in the notch in the upper end of said standard, spring means also disposed substantially wholly within the space between said brackets in the space in rear of the upper portion of the standard, said spring means acting at one end against said brackets, and means connecting the other end of said spring means with said lever for yieldably holding said standard against pivoting relative to said brackets.

2. In a plow including a generally fore-and-aft extending beam having a pair of generally laterally spaced brackets fixed along their upper edge portions to the rear end of said beam on opposite sides thereof, the improvement which comprises a standard disposed generally vertically, a plow bottom fixed to the lower end of said standard, means for pivotally connecting the intermediate portion of said standard above said plow bottom to the lower portions of said brackets, the upper portion of said plow standard being notched, an apertured lever carrying a roller at one end adapted to enter said notch, a pivot member extending through the aperture in said lever and having reduced non-circular ends, said bracket plates having non-circular openings formed to receive said non-circular ends of said pivot member, spring means acting against one of said bracket plates at one end and at its other end against the other end of said lever, and bolt means for clamping said bracket plates together, said bolt means being disposed between the upper portion of said standard and said spring means and serving to hold said bracket plates together so as to retain said pivot means in position and so as to hold the lower portions of said bracket plates against the sides of said standard.

3. For use in an overload responsive plow, comprising a beam structure, a generally vertically disposed standard pivotally connected at a midpoint with said beam structure, a plow bottom fixed to the lower end of said standard, the upper end of said standard being notched to provide a generally arcuate socket, a roller-supporting lever pivotally connected with the beam structure supported in a position to dispose said roller in said socket, and spring means acting against said lever for releasably holding said roller in said socket, the improvement comprising means forming relieved portions at each side of said socket, said portions serving as dirt discharge recesses.

4. In a plow, a beam, a pair of laterally spaced apart bracket plates fixed to said beam along their upper edges, opposite lower portions of said brackets being apertured, a generally vertically disposed standard pivotally connected with the lower portions of said brackets, a lever swingably connected with said brackets above said standard and below said beam and including two spaced apart members, a roller carried between said members adjacent one end of the lever, the upper end of said standard having a portion of reduced thickness disposed at least partially between said lever members, said portion being notched to releasably receive said roller, and resiliently yieldable means disposed substantially entirely between said brackets and acting between the latter and the other end of said pivoted lever.

5. In a plow, a beam, a pair of laterally spaced apart bracket plates fixed to said beam along their upper edges, opposite lower portions of said brackets being apertured, a generally vertically disposed standard pivotally connected with the lower portions of said brackets, a lever pivoted to said brackets above said standard and disposed generally horizontally below said beam, said lever including two spaced apart members and a beam-contacting means carried between said members adjacent one end of the lever, the upper end of said standard lying forward of the upper rear edge portions of said brackets and having a portion of reduced thickness disposed at least partially between said lever members, and a generally vertically arranged spring means disposed between said rear edge portions of said brackets and reacting at its lower end against the brackets and at its upper end against the rear end of said lever for yieldably holding said standard against pivoting relative to said brackets.

6. In a plow including a generally fore-and-aft extending beam having a pair of generally laterally spaced brackets fixed along their upper edge portions to the rear end of said beam on opposite sides thereof, the improvement which comprises a standard disposed generally vertically, a plow bottom fixed to the lower end of said standard, means for pivotally connecting the intermediate portion of said standard above said plow bottom to the lower portions of said brackets, the upper end of said standard being notched, resiliently yieldable means acting against the upper end of said standard for releasably holding the latter against swinging about the pivotal connection of said standard with the lower end portions of said brackets, said resiliently yieldable means comprising a lever pivotally mounted between the upper portions of said brackets above said standard and below the rear end of said beam, means on one end of said lever seating in the notch in the upper end of said standard, a lug fixed to one of said brackets adjacent the lower portion thereof, said lug being apertured, a rod disposed for generally vertical movement in said apertured lug and pivotally connected at its upper end to the other end of said lever, spring means surrounding said rod and disposed between said brackets at the rear portion thereof, the lower end of said spring means acting against said lug, and means on the upper portion of said rod for receiving the upper end of said spring means.

7. In a plow including a generally fore-and-aft extending beam having a pair of generally laterally spaced triangular brackets fixed along their upper edge portions to the rear end of said beam on opposite sides thereof, the improvement which comprises a standard disposed generally vertically, a plow bottom fixed to the lower end of said standard, means for pivotally connecting the intermediate portion of said standard above said plow bottom to the lower portions of said triangular brackets, the upper portion of said plow standard being notched, an apertured lever carrying a roller adapted to enter said notch, a pivot member extending through the aperture in said lever and having reduced non-circular ends, said bracket plates having non-circular openings formed to receive said non-circular ends of said pivot member, spring means acting against said lever for yieldably holding said roller in seating arrangement with the notch on the upper portion of said standard, the other end of said spring means acting against one of said brackets, and bolt means for clamping said bracket plates together, said bolt means being disposed between the upper portion of said standard and said spring means and serving to hold said bracket plates together so as to retain said pivot means in position and so as to hold the lower portions of said bracket plates against the sides of said standard.

8. In a plow, a beam, a pair of laterally spaced apart bracket plates fixed to said beam along their upper edges, opposite lower portions of said brackets being apertured, a generally vertically disposed standard pivotally connected with the lower portions of said brackets, the upper portions of said standard lying between and substantially contacting the inner faces of said brackets, a part pivotally connected to move relative to said brackets and disposed above said standard and below said beam, said part including two spaced apart members, a roller carried between said members adjacent one end of said part, the upper end of said standard having a portion of reduced thickness disposed at least partially between said members, said portion being notched to releasably receive said roller, and resiliently yieldable means disposed substantially entirely between said brackets and acting between the latter and said part for releasably holding said roller in said notch, said portions of reduced thickness having portions further reduced in thickness adjacent the points of contact between said roller and said standard to serve as dirt discharge recesses.

9. In a plow, a beam, a pair of laterally spaced apart bracket plates fixed to said beam along their upper edges, opposite lower portions of said brackets being apertured, a generally vertically disposed standard pivotally connected with the lower portions of said brackets, the upper portions of said standard lying between and substantially contacting the inner faces of said brackets, a lever pivoted to said brackets adjacent the upper end of said standard and below said beam and including two spaced apart members, a roller carried between said members adjacent one end of the lever, the upper end of said standard having a portion of reduced thickness disposed at least partially between said lever members, said portion being notched to releasably receive said roller, and resiliently yieldable means disposed substantially entirely between said brackets and acting between the latter and said pivoted lever.

References Cited in the file of this patent
UNITED STATES PATENTS

| 1,078,871 | Olson | Nov. 18, 1913 |
| 1,253,961 | Grimsrud | Jan. 15, 1918 |
| 1,331,424 | Fanberg | Feb. 17, 1920 |
| 1,808,478 | Printz | June 2, 1931 |
| 2,316,393 | Bloodworth | Apr. 13, 1943 |
| 2,331,686 | Hintz | Oct. 12, 1943 |
| 2,385,935 | Oerman | Oct. 2, 1945 |
| 2,399,818 | Michael | May 7, 1946 |

FOREIGN PATENTS

| 313,139 | Germany | July 5, 1919 |
| 19,513/29 | Australia | Mar. 13, 1930 |
| 103,706 | Australia | Apr. 11, 1938 |
| 114,427 | Sweden | July 3, 1945 |
| 613,310 | Great Britain | Nov. 25, 1948 |